United States Patent [19]
Bedard

[11] 3,792,711
[45] Feb. 19, 1974

[54] IRRIGATION TRAIL LINE DRAIN VALVES
[75] Inventor: Joseph A. Bedard, Eugene, Oreg.
[73] Assignee: Ireco Industries, Inc., Eugene, Oreg.
[22] Filed: Oct. 17, 1972
[21] Appl. No.: 298,334

[52] U.S. Cl.............. 137/217, 239/111, 239/212, 285/5
[51] Int. Cl. .................... E03c 1/10, F16k 45/00
[58] Field of Search ....... 285/5, 239, 370, 397, 345; 239/177, 212, 213, 111; 137/344, 217, 167

[56] References Cited
UNITED STATES PATENTS

| 3,603,508 | 9/1971 | Ingram | 239/212 |
|---|---|---|---|
| 3,281,081 | 10/1966 | Purtell | 239/213 |
| 585,014 | 6/1897 | Wenzel et al. | 285/239 |
| 3,516,609 | 6/1970 | Gheen et al. | 239/212 |
| 2,649,105 | 8/1953 | Stout et al. | 285/5 X |

FOREIGN PATENTS OR APPLICATIONS

| 202,214 | 6/1956 | Australia | 285/5 |

Primary Examiner—M. Henson Wood, Jr.
Assistant Examiner—John J. Love
Attorney, Agent, or Firm—Klarquist, Sparkman, Campbell, Leigh, Hall & Whinston

[57] ABSTRACT

A trail line press-in drain valve has a pair of press-in tubes having tapered ends and joined to tapered ends of an enlarged drain tube having a hole in its side in which a check valve is mounted. The press-in tubes are pressed into trail line pipe sections to drain the trail line when the trail line extends downhill. A similar press-in drain valve connects a trail line shoe to a trail line.

2 Claims, 4 Drawing Figures

PATENTED FEB 19 1974 3,792,711
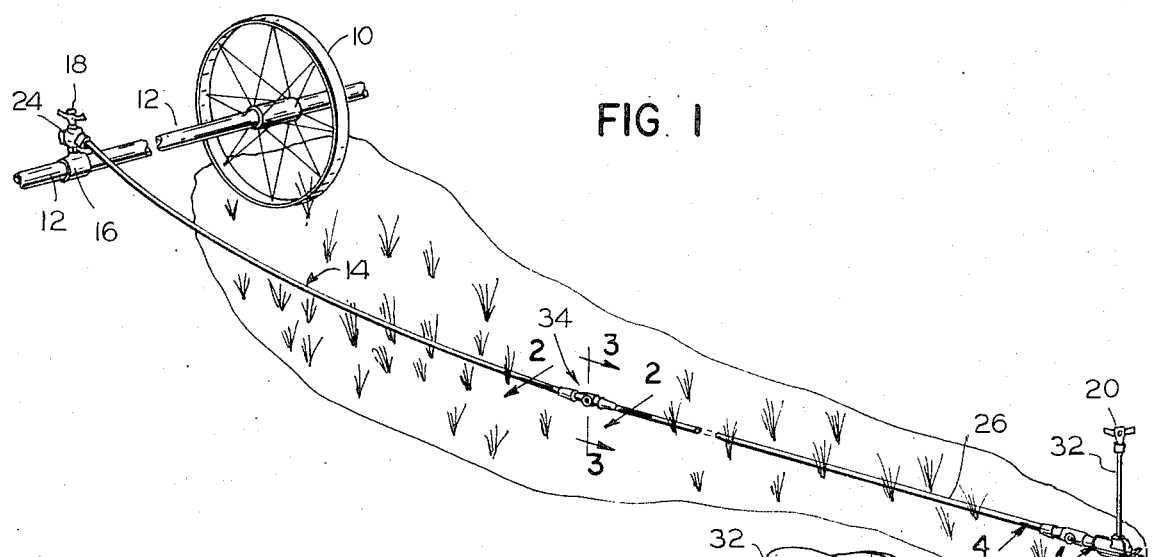
FIG. 1
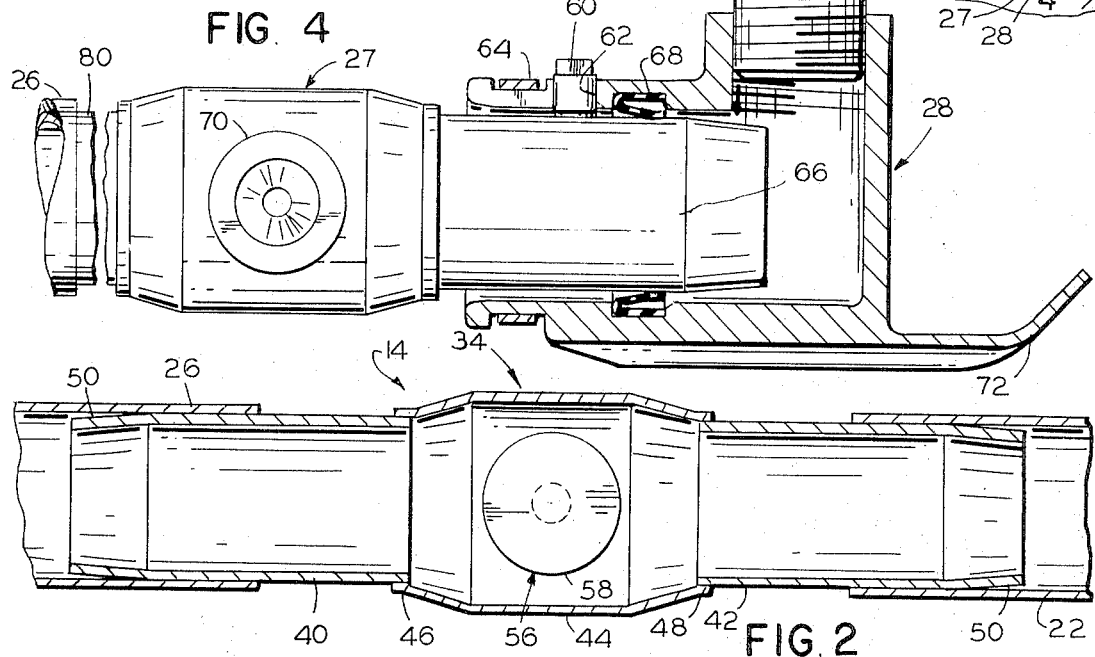
FIG. 4
FIG. 2
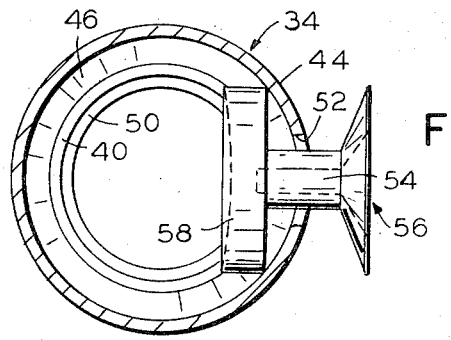
FIG. 3

IRRIGATION TRAIL LINE DRAIN VALVES

DESCRIPTION

This invention relates to improved irrigation trail line drain valves, and more particularly to press-in drain valves.

An object of the invention is to provide improved irrigation trail line valves.

Another object of the invention is to provide press-in drain valves.

A further object of the invention is to provide a short pipe section having a drain valve therein and adapted to be placed in a trail line at the front end of the portion of the trail line touching the ground.

Another object of the invention is to provide a press-in drain valve adapted to be pressed into an end of a trail line and also fitting in and keyed to a sprinkler carrying shoe.

In the drawings:

FIG. 1 is a fragmentary, perspective view of an irrigation move including trail line press-in drain valves forming embodiments of the invention;

FIG. 2 is an enlarged, vertical, sectional view taken along line 2—2 of FIG. 1;

FIG. 3 is an enlarged, vertical, sectional view taken along line 3—3 of FIG. 1; and FIG. 4 is an enlarged, sectional view taken along line 4—4 of FIG. 1.

Referring now in detail to the drawings, there is shown therein, an irrigation move including wheels 10 rotatable on a main pipe 12 and trail lines 14 connected to the pipe by rotary couplings 16 for supplying water under pressure to the trail lines and to sprinklers 18 carried by the couplings 16, trail line sprinklers 20 being supplied by the trail line. Each trail line (only one being shown) includes a forward pipe section 22 detachably connected to a T-coupling 24 carried by the coupling 16, and also includes a rear pipe section 26 connected to a press-in drain valve 27 forming one embodiment of the invention. A sprinkler drag shoe 28 is connected to the other end of the press-in drain valve 27, and carries a riser 32 on which the sprinkler 20 is mounted. A press-in drain valve 34 forming an alternate embodiment of the invention connects together the trail line pipe sections 22 and 26.

The press-in drain valve 34 (FIGS. 2 and 3) includes end press-in tubes 40 and 42 brazed to an enlarged central tube 44 having tapered ends 46 and 48 receiving tightly the tubes 40 and 42, respectively. The tubes 40 and 42 have tapered end portions 50 facilitating pressing thereof into the pipe sections 22 and 26, the tubes 40 and 42 expanding the pipe sections somewhat as they are pressed in and preventing rotation and longitudinal movement of the pipe sections relative to the tubes 40 and 42. The central tube 44 has a cylindrical central portion having a hole 52 therein through which a stem 54 of a known pressure responsive check valve 56 extends loosely. When there is sprinkling pressure in the trail line, head 58 of the valve is pressed against the cylindrical inner wall of the central portion of the tube 44 to close off the hole 52. When the sprinkling pressure is cut off, the head 58 opens the hole 52 and water drains out of the hole 58 to facilitate moving the line move. The position of the valve 56 and hole 52 at the side of the valve 34 elevates it off the ground to tend to prevent clogging of the hole with dirt or debris. The trail line 14 extends downwardly and rearwardly from the main pipe 12 and normally touches the ground about halfway from the pipe 12 to the drag shoe fitting 28. Preferably the drain valve 34 is positioned at the point the trail line first touches the ground so that, if the valve 27 and shoe 28 are uphill from the valve 34 when draining is needed prior to starting the move, the valve 34 drains the entire trail line.

The trail line drain valve 27 (FIG. 4) is identical to the trail line drain valve 34 but also includes a keying lug 60 splined in a slot 62 in the shoe 28 and trapped in the slot 62 by a releasable split band 64. End tube 66 fits sealingly in seal 68 in the shoe 28. A valve 70 like the valve 56 closes a hole in the assembly 27 only when there is operating pressure in the drain line. The shoe has a shoe portion or skid 72. The valve 27 drains the trail line whenever the line is to be moved and the shoe is not higher than the valve 27. A front tube 80 like the tube 40 is pressed into the pipe section 26 to both key the valve 27 to the pipe section 26 and secure the valve against longitudinal movement relative to the pipe section.

The lug 60 of the valve 27 is positioned far enough from the tapered end of the tube 66 that a sufficient length of the tube 66 can be pressed into a pipe section to form a good joint so that the valve 22 can be used in place of the valve 34 to connect two pipe sections together. In other words, the valve 27 could have a lug like the lug 60 without interfering at all with its effectively connecting the two pipe sections together.

The valve 27 may have two horizontal openings like the opening 52, the positioned at diametrically opposite sides of the enlarged central portion, and a second valve 70 being positioned therein. With this arrangement, the drainage is twice as fast, and both valves 70 are positioned up off the ground.

What is claimed is:

1. In a trail line press-in drain valve,
   a central tubular member having a central portion of a predetermined diameter having a lateral drain opening and end portions tapering to a diameter smaller than said predetermined diameter,
   a pair of end tubes smaller in diameter than said predetermined diameter and joined to the end portions of the central tubular member,
   the outer ends of the end tubes being tapered to facilitate pressing the end tubes into trail line sections,
   and pressure responsive valve means carried by the central tubular member and closing the opening when the central tubular member has water under sprinkling pressure therein and opening the opening when the central tubular member has water therein under a lower pressure.

2. The drain valve of claim 1 including a splining and thrust transmitting lug on one of the end tubes.

* * * * *